United States Patent
Johnson et al.

(10) Patent No.: US 9,365,431 B2
(45) Date of Patent: Jun. 14, 2016

(54) SYNTHESIS OF ZSM-58 CRYSTALS WITH IMPROVED MORPHOLOGY

(71) Applicants: Ivy D. Johnson, Lawrenceville, NJ (US); Nadya A. Hrycenko, Clinton, NJ (US); Barbara Carstensen, Annandale, NJ (US); Machteld Mertens, Flemington, NJ (US); Brita Engels, Begijnendijk (BE)

(72) Inventors: Ivy D. Johnson, Lawrenceville, NJ (US); Nadya A. Hrycenko, Clinton, NJ (US); Barbara Carstensen, Annandale, NJ (US); Machteld Mertens, Flemington, NJ (US); Brita Engels, Begijnendijk (BE)

(73) Assignee: ExxonMobil Research and Engineering Company, Annandale, NJ (US)

( * ) Notice: Subject to any disclaimer, the term of this patent is extended or adjusted under 35 U.S.C. 154(b) by 474 days.

(21) Appl. No.: 14/074,881

(22) Filed: Nov. 8, 2013

(65) Prior Publication Data
US 2014/0161717 A1 Jun. 12, 2014

Related U.S. Application Data

(60) Provisional application No. 61/734,007, filed on Dec. 6, 2012, provisional application No. 61/734,010, filed on Dec. 6, 2012, provisional application No. 61/734,012, filed on Dec. 6, 2012.

(51) Int. Cl.
*C01B 39/04* (2006.01)
*B01D 53/047* (2006.01)
(Continued)

(52) U.S. Cl.
CPC ............... *C01B 39/04* (2013.01); *B01D 53/02* (2013.01); *B01D 53/04* (2013.01); *B01D 53/047* (2013.01); *B01D 53/0423* (2013.01); *B01D 53/0462* (2013.01); *B01D 53/0473* (2013.01);
(Continued)

(58) Field of Classification Search
CPC ......... C01B 39/04; B01J 29/70; B01J 35/023; B01J 35/026
See application file for complete search history.

(56) References Cited

U.S. PATENT DOCUMENTS

| | | | |
|---|---|---|---|
| 4,698,217 A | 10/1987 | Valyocsik et al. | |
| 5,039,641 A | 8/1991 | Vansant et al. | |

(Continued)

FOREIGN PATENT DOCUMENTS

| | | | |
|---|---|---|---|
| EP | 0142317 | * | 5/1985 |
| EP | 0255770 A2 | | 2/2008 |

OTHER PUBLICATIONS

International Search Report with Written Opinion for PCT/US2013/069080 dated Apr. 17, 2014.
(Continued)

*Primary Examiner* — David M Brunsman
(74) *Attorney, Agent, or Firm* — Andrew T. Ward; David M. Weisberg

(57) ABSTRACT

Methods are provided for synthesizing ZSM-58 crystals with an improved morphology and/or an improved size distribution. By controlling the conditions during synthesis of the ZSM-58 crystals, crystals of a useful size with a narrow size distribution can be generated. Additionally, by controlling the ratio of water content to silica content in the synthesis mixture, it has unexpectedly been found that ZSM-58 crystals can be formed with an improved morphology. The improved morphology can result in ZSM-58 crystals with a more uniform size across the various dimensions of the crystal, which allows for more uniform diffusion within the crystal. This is in contrast to conventionally synthesized crystals, where the size of the crystal can vary along different axes of the crystals.

20 Claims, 4 Drawing Sheets

(51) Int. Cl.
  *B01D 53/04* (2006.01)
  *B01D 69/14* (2006.01)
  *B01J 20/30* (2006.01)
  *C01B 39/48* (2006.01)
  *B01D 53/02* (2006.01)
  *C01B 37/02* (2006.01)
  *B01J 35/02* (2006.01)

(52) U.S. Cl.
  CPC ........... *B01D69/147* (2013.01); *B01J 20/3078* (2013.01); *C01B 37/02* (2013.01); *C01B 39/48* (2013.01); *B01D 2253/108* (2013.01); *B01D 2256/245* (2013.01); *B01D 2257/102* (2013.01); *B01D 2257/504* (2013.01); *B01J 35/023* (2013.01); *B01J 35/026* (2013.01); *Y02C 10/08* (2013.01); *Y02P 20/152* (2015.11)

(56) References Cited

U.S. PATENT DOCUMENTS

| | | | |
|---|---|---|---|
| 5,200,377 | A | 4/1993 | Zones et al. |
| 5,425,933 | A * | 6/1995 | Nakagawa ............... C01B 37/02 423/706 |
| 6,051,517 | A | 4/2000 | Funke et al. |
| 6,767,384 | B1 | 7/2004 | Vu et al. |
| 7,255,725 | B2 | 8/2007 | Chau et al. |
| 8,067,327 | B2 | 11/2011 | Li et al. |
| 9,095,809 | B2 * | 8/2015 | Deckman ............... B01D 53/04 |
| 9,168,483 | B2 * | 10/2015 | Ravikovitch ........... B01D 53/04 |
| 2006/0079725 | A1 | 4/2006 | Li et al. |
| 2006/0169142 | A1 | 8/2006 | Rode et al. |
| 2008/0105627 | A1 | 5/2008 | Isomura |
| 2008/0282884 | A1 | 11/2008 | Kelley et al. |
| 2008/0282885 | A1 | 11/2008 | Deckman et al. |
| 2008/0282886 | A1 | 11/2008 | Reyes et al. |
| 2008/0282892 | A1 | 11/2008 | Deckman et al. |
| 2009/0007780 | A1 | 1/2009 | Yajima et al. |
| 2009/0111959 | A1 | 4/2009 | Cao et al. |
| 2010/0018926 | A1 | 1/2010 | Liu et al. |
| 2011/0094380 | A1 | 4/2011 | Li et al. |
| 2011/0146606 | A1 | 6/2011 | Cannella |

OTHER PUBLICATIONS

International Search Report with Written Opinion for PCT/US2013/069060 dated Apr. 8, 2014.

Office Action from related U.S. Appl. No. 14/074,860 dated Jan. 13, 2015.

Office Action from related U.S. Appl. No. 14/074,918 dated Jun. 8, 2015.

Olson et al, "Light hydrocarbon sorption properties of pure silica Si-CHA and ITQ-3 and high silica ZSM-58", Microporous and Mesoporous Materials, 2004, pp. 27-33, vol. 67, Science Direct, Elsevier Inc.

Zheng et al, "Synthesis, characterization, and modification of DDR membranes grown on alpha-alumina supports", Journal of Materials Science, 2008, pp. 2499-2502, vol. 43, Springer Science+Business Media, LLC.

Den Exter et al, "Separation of Permanent Gases on the All-Silica 8-Ring Clathrasil DD3R", Zeolites and Related Microporous Materials: State of the Art 1994, Studies in Surface Science and Catalysis, 1994, pp. 1159-1166, vol. 84, Elsevier Science B.V.

Tomita et al, "Gas separation characteristics of DDR type zeolite membrane," Microporous and Mesoporous Materials, 2004, pp. 71-75, vol. 68, Science Direct, Elsievier Inc.

Potapova, "Synthesis and characterization of the DDR type zeolite" (Master Thesis), Lulea University of Technology, Department of Chemical Engineering and Geosciences, Division of Chemical Technology, Jun. 2007.

Himeno et al., "Methane and Carbon Dioxide Adsorption on the All-Silica DD3R Zeolite", ZMPC2006, p. 2036 (2006).

Himeno et al., "Characterization and selectivity for methane and carbon dioxide adsorption on the all-silica DD3R zeolite", Microporous and Mesoporous Materials, Jan. 5, 2007, pp. 62-69, vol. 98, issues 1-3, ScienceDirect, Elsevier.

Ernst et al., "Hydrothermalsynthese des Zeoliths ZSM-58 and templatfreie Synthese von Zeolith ZSM-5", Chemie Ingenieur Technik, Jul. 1, 1991, vol. 63, No. 7, pp. 748-750.

Kumita et al., "Shape selective methanol to olefins over highly thermostable DDR catalysts", Applied Catalysis A: General, Jul. 13, 2010, vol. 391, No. 1, pp. 234-243, Elsevier.

International Search Report with Written Opinion for PCT/US2013/069073 dated Jun. 5, 2014.

* cited by examiner

SYNTHESIS OF ZSM-58 CRYSTALS WITH IMPROVED MORPHOLOGY

CROSS-REFERENCE TO RELATED APPLICATIONS

This application claims the benefit of U.S. Application Ser. No. 61/734,007, filed on Dec. 6, 2012; which is incorporated by reference herein in its entirety. This application is also related to U.S. Application Ser. Nos. 61/734,010 and 61/734,012, also filed on Dec. 6, 2012, and the two other co-pending U.S. utility patent applications filed on even date herewith and claiming priority thereto, respectively, all of which are hereby incorporated by reference herein in their entirety.

FIELD OF THE INVENTION

Zeolites with improved morphology are described, along with methods for preparing the same.

BACKGROUND OF THE INVENTION

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One example of a zeolite that is potentially suitable for selective adsorption of molecules is ZSM-58. ZSM-58 is a DDR-type zeolite with an 8-member ring structure. U.S. Pat. No. 4,698,217 describes a method for synthesizing ZSM-58 using a methyltropinium salt as the directing agent.

SUMMARY OF THE INVENTION

In one aspect, a composition is provided that comprises ZSM-58 crystals having a rounded disc morphology with an axis ratio of 1.1 or less, the axis ratio being a ratio of the vertex-to-vertex distance and the edge-to-edge distance, a depth dimension being less than the vertex-to-vertex distance and the edge-to-edge distance, the ZSM-58 crystals having a unimodal volume versus crystal size distribution where less than 10 volume percent of the ZSM-58 crystals have a characteristic size of about 5 µm or less, the ZSM-58 crystals have a purity of at least about 90%.

In another aspect, a method is provided for synthesizing a DDR framework type zeolite. The method includes forming a reaction mixture capable of forming crystalline DDR framework type material, such as ZSM-58 crystals, the mixture comprising water, a silicon oxide, an alkali or alkaline earth hydroxide, and a methyltropinium salt structure directing agent, the mixture having a molar ratio of water to silicon oxide of about 12 to about 25, a molar ratio of hydroxide to silicon oxide of about 0.01 to about 1.0, a molar ratio of alkali or alkaline earth metal to silicon dioxide of about 0.01 to about 1.0, a molar ratio of structure directing agent to silicon dioxide of about 0.01 to about 1.0, and at least about 0.05 wt % of seeds relative to the weight of the silica in the mixture; and recovering DDR framework type crystals (such as ZSM-58 crystals) having an axis ratio of 1.1 or less, the axis ratio being a ratio of a vertex-to-vertex distance and an edge-to-edge distance, a depth dimension being less than the vertex-to-vertex distance and the edge-to-edge distance.

In still another aspect, a method is provided for synthesizing a DDR framework type zeolite. The method includes forming a reaction mixture capable of forming crystalline DDR framework type material, such as ZSM-58 crystals, the mixture comprising water, silicon oxide, an alkali or alkaline earth hydroxide, and a methyltropinium salt structure directing agent, the mixture having a molar ratio of hydroxide to silicon oxide of about 0.01 to about 1.0, a molar ratio of alkali or alkaline earth metal to silicon dioxide of about 0.01 to about 1.0, a molar ratio of structure directing agent to silicon dioxide of about 0.01 to about 1.0, and at least about 0.05 wt % of seeds relative to the weight of the silica in the mixture; and recovering DDR framework type crystals (such as ZSM-58 crystals) having a unimodal volume versus crystal size distribution where less than 10 volume percent of the DDR framework type crystals (such as ZSM-58 crystals) have a characteristic size of about 5 µm or less, a crystal size for a peak in the volume versus crystal size distribution is about 15 µm to about 40 µm, and a peak height in the volume versus crystal size plot with a 1 µm bin width is at least about 10 volume percent.

DETAILED DESCRIPTION OF THE EMBODIMENTS

Overview

Figure 1A:
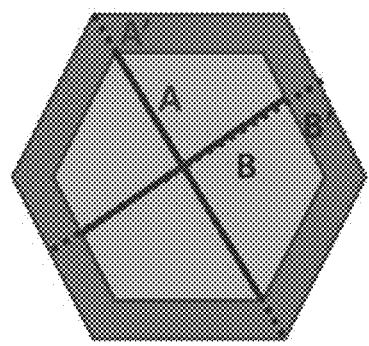
FIG. 1A schematically shows an example of the distances to use for determining the axis ratio of a crystal in an SEM micrograph.

ZSM-58 is an 8-membered ring crystal with a DDR crystal structure, and the methods herein relating to formation of ZSM-58 crystalline material is believed to be easily translatable to the formation of other DDR framework type crystalline materials. Potential uses for DDR/ZSM-58 include uses in separation of gases. For example, due to the pore size of DDR/ZSM-58, the crystals can be suitable for separating molecules such as $N_2$ and $CO_2$ from low molecular weight hydrocarbons such as $CH_4$. ZSM-58 is viewed conventionally as being an expensive crystal structure to form. This may be due in part to the high cost of the typical structure directing agent, methyltropinium salts like the iodide form, as well as the high $H_2O$: $SiO_2$ ratio and/or low throughput of conventional synthesis techniques.

In addition to being a relatively expensive crystal to synthesize, conventional ZSM-58 synthesis techniques can tend to produce crystals with poor size uniformity (relatively broad size distribution). As noted above, one application for ZSM-58 can be in gas phase separation. For zeolite crystals used in a gas phase separation, it can be beneficial to produce crystals with a relatively narrow distribution of sizes. Maintaining a relatively narrow size distribution can assist with having relatively uniform and/or relatively easily predictable adsorption (or other zeolite activity/reaction) across the crystals within a device, such as a separation device. Additionally, it can also be beneficial for individual crystals to have relatively isotropic reaction and/or adsorption activity. In other words, it can be desirable for an individual crystal to exhibit similar activity and/or adsorption properties, independent of how the crystal is aligned relative to a potential reactant or adsorbent. This uniformity of behavior for a single crystal can often be impacted by the morphology of a crystal.

In various aspects, methods are provided for synthesizing ZSM-58 crystals with an improved morphology and/or an improved size distribution. By controlling the conditions during synthesis of the ZSM-58 crystals, crystals of a useful size with a narrow size distribution can be generated. Additionally, by controlling the ratio of water content to silicon oxide ($SiO_2$) content in the synthesis mixture, it has unexpectedly been found that ZSM-58 crystals can be formed with an improved morphology. The improved morphology can result in ZSM-58 crystals with a more uniform size across the various dimensions of the crystal, which can thus allow for more uniform diffusion among the distribution of crystals. This can be in contrast to conventionally synthesized crystals, where the size of the crystal can vary significantly along different axes of the crystals. This change in morphology can be achieved without changing the size range of the crystals. In other words, crystals of comparable size with two different morphologies can be created by selecting appropriate synthesis conditions. In some aspects, the methods for synthesizing ZSM-58 crystals can include methods for using methyltropinium chloride or methyltropinium hydroxide as a structure directing agent, in contrast to the methyltropinium iodide that has been traditionally used.

Crystal Morphology and Synthesis Throughput

A typical recipe for the synthesis mixture for a zeolite can include relatively broad ranges for the allowed ratios of reactants. For example, the initial description of ZSM-58 synthesis in U.S. Pat. No. 4,698,217 described $SiO_2:Al_2O_3$ ratios of 50-1000 and $H_2O:SiO_2$ ratios of 5-200.

Although U.S. Pat. No. 4,698,217 generally discloses $H_2O:SiO_2$ ratios of 5-200, it is noted that the examples provided therein exhibited an $H_2O:SiO_2$ ratio of only 40. Water itself may not generally be viewed as having a direct impact on the types of crystals formed during synthesis. Instead, the amount of water added to a zeolite synthesis mixture can be arbitrary or can be selected based on a variety of factors. One set of factors can be related to providing enough liquid in the synthesis mixture to solubilize the raw materials and to also achieve a relatively homogenous mixture. If the synthesis mixture is not sufficiently homogenized, crystal formation may occur at a lower rate and/or crystals other than the desired type may form. Adding more water to a synthesis mixture can help to insure that all of the components can be sufficiently soluble (dissolved) in the water, as well as to assist in achieving a sufficiently homogenous mixture when mixed. However, water can also act as a diluent. Thus, another consideration or factor can be related to the impact of water on process throughput. Once enough water is present to allow formation of a homogenous m mixture, any additional water can tend to unnecessarily slow the synthesis process for the desired crystals. This can be due in part to the need to remove the water once the desired crystals are formed. From a practical standpoint, ratios of $H_2O:SiO_2$ of about 40-50 were believed to provide enough water for forming a homogenous mixture without having an undue excess of water.

It has been unexpectedly discovered that reducing the $H_2O:SiO_2$ molar ratio, in combination with including seed crystals in the synthesis mixture, can have an impact on crystal formation for ZSM-58. Instead of just serving as a medium for mixing the reagents, it has been discovered that using a $H_2O:SiO_2$ ratio from about 12 to about 25 (e.g., from about 12 to about 20) in the presence of seed crystals can result in formation of ZSM-58 crystals with a distinct and desirable morphology. Conventional synthesis mixtures for forming ZSM-58 led to formation of crystals that corresponded to a discotic morphology with hexagonal faceting. The hexagonal disc morphology can generally have primarily hexagonal faces. The top and bottom hexagonal faces can generally correspond to larger hexagonal faces, with a smaller depth dimension (roughly) perpendicular to the top and bottom faces. By contrast, synthesis mixtures with a $H_2O:SiO_2$ ratio from about 12 to about 20 and including seed crystals can result in formation of crystals with a rounded or (approaching) circular disc face/shape. The depth dimension for the rounded discs can also be smaller than the lateral dimensions of the rounded faces of the disc.

Figure 3A:
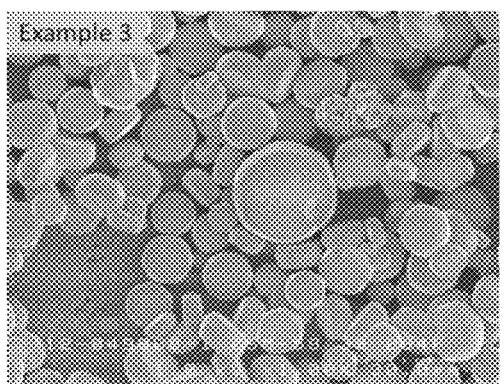
FIGS. 3A and 3B show an SEM micrograph and a size distribution for ZSM-58 crystals with a rounded disc morphology.

Differences in the conventional hexagonal disc morphology and the rounded disc morphology can be seen in SEM micrographs, for example. FIG. 1b shows an example of ZSM-58 crystals formed using a synthesis mixture having a $H_2O:SiO_2$ ratio of ~47 (additional synthesis details are provided in Example 1 below). As shown in FIG. 1b, the ZSM-58 crystals primarily have hexagonal faces. By contrast, FIG. 3a shows that ZSM-58 crystals formed using a similar synthesis mixture, but with a $H_2O:SiO_2$ ratio of only ~19, seem to have the appearance of circular or rounded discs (see Example 3 below for additional synthesis details). X-ray diffraction (XRD) techniques have been used to verify that crystals with the rounded disc morphology shown in FIG. 3 also appear to have the ZSM-58 crystal structure.

One way to characterize the difference between the conventional hexagonal disc morphology and the rounded disc morphology can be based on the difference between the vertex-to-vertex distance and the edge-to-edge distance in a hexagonal face of a crystal. To perform this type of characterization, an initial step can be to identify the correct face(s) of the crystal for performing the characterization. For a hexagonal disc crystal, the combination of a vertex-to-vertex line and an edge-to-edge line can roughly define a plane. The dimension perpendicular to this plane can then correspond to the depth of the crystal. For the hexagonal disc morphology, this depth dimension can generally be shorter than either the vertex-to-vertex distance or the edge-to-edge distance. If the depth distance is longer than either of the other two distances, then either a different hexagonal face should be selected for this calculation, or the crystal may not correspond to a hexagonal disc or rounded disc morphology. After determining that the correct type of hexagonal (or rounded) face has been selected for characterizing the crystal, the vertex-to-vertex distance and the edge-to-edge distance for the hexagonal face can be compared in order to calculate an axis ratio.

Figure 1B:
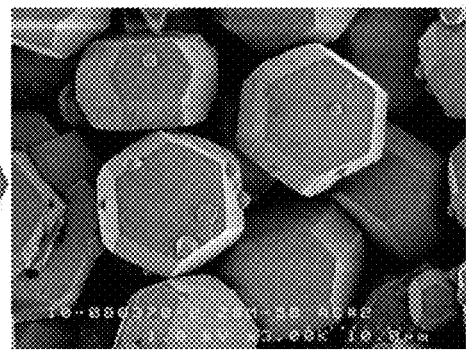
FIGS. 1B and 1C show SEM micrographs of ZSM-58 crystals with a hexagonal morphology.

FIG. 1a shows a schematic example of this type of calculation. In FIG. 1a, line 110 corresponds to the vertex-to-vertex distance for a hexagon. Line 120 corresponds to the edge-to-edge distance. For a hexagonal face with well defined edges and vertices, the vertex-to-vertex distance, by definition, is typically larger than the edge-to-edge distance. As the angles and edges of the hexagon become smoothed toward forming a circle, to the degree that the vertices and edges can still be identified, the vertex-to-vertex distance and the edge-to-edge distance can become increasingly closer. In the limiting case of a circle, the axis ratio of vertex-to-vertex distance and edge-to-edge distance becomes 1, with the caveat that the location of a "vertex" and an "edge" in the limiting case may be somewhat arbitrary.

For crystals of the type shown in FIG. 1b, the ratio of vertex-to-vertex distance versus edge-to-edge distance can be determined based on measuring distances in an SEM micrograph. The crystals shown in FIG. 1b are representative of crystals formed using synthesis mixtures with $H_2O:SiO_2$ ratios of about 40 or greater. For ZSM-58 crystals formed from such mixtures with a hexagonal disc morphology, the axis ratio of the vertex-to-vertex distance versus the edge-to-edge distance was observed to be at least about 1.15, such as at least about 1.2.

In contrast to the hexagonal disc morphology, synthesis mixtures with lower ratios of water to silica can be used to form crystals with a rounded disc morphology. The characterization of the rounded disc morphology crystals can be performed in a similar manner. The depth dimension can be identified in relation to the rounded (approaching circular) face(s) of the crystal. In some embodiments, a ratio of the depth dimension to the edge-to-edge distance can be about 0.9 or less, e.g., about 0.85 or less. In such embodiments, crystals with a ratio of depth dimension to edge-to-edge distance of greater than about 0.95 were identified to correspond to a roughly spherical morphology. The rounded face of the rounded discs can then be characterized using the axis ratio. For the rounded discs shown in FIG. 3a, the axis ratio of the vertex-to-vertex distance versus edge-to-edge distance can be about 1.1 or less, e.g., about 1.05 or less, or a still lower value that can approach the limiting axis ratio value of 1.0.

The rounded disc morphology, with an axis ratio of about 1.1 or less, can unexpectedly provide benefits for applications such as separation of gases. For hexagonal morphology crystals, the path length from the center of the crystal to the exterior of a crystal can vary depending on the direction of flow within the crystal. A first path length can be observed for gases traveling toward an edge, while a second path length can be observed for gases traveling toward a vertex. This difference in path length within a crystal can lead to anisotropic behavior in an adsorption/desorption context and/or catalytic reactivity context. The rounded disc morphology can reduce the difference in path lengths within the crystal, e.g., in comparison with the hexagonal disc morphology, thus reducing the potential for anisotropic behavior within a crystal.

Structure Directing Agents—Methyltropinium Chloride

For many types of zeolites, formation of a desired zeolite can be highly sensitive to the nature of the structure directing agent. Even within a family of related structure directing agents, such as a series of organic halides, changing from one halide to another can lead to significant modifications in the resulting crystals formed from a synthesis mixture. In various embodiments, it has been discovered that methyltropinium chloride can be used as a structure directing agent in place of methyltropinium iodide while producing similar crystals.

Methyltropinium iodide has been used as the structure directing agent for previously published working examples of ZSM-58 synthesis. However, methyltropinium iodide can be a relatively expensive reagent. Additionally, iodide salts can generally be less preferred for industrial synthesis procedures for microporous materials, perhaps due to certain hazards presented by some iodide salts, such as certain health risks posed by iodide salt precursors. Methyltropinium chloride can offer a lower cost structure directing agent option, which can potentially allow for reduced ZSM-58 production costs. It has been determined that methyltropinium chloride can be used in place of methyltropinium iodide, while generating similar types of ZSM-58 crystals. In addition to methyltropinium chloride, methyltropinium hydroxide can additionally or alternately be used as a lower cost alternative to methyltropinium iodide.

Synthesis of DDR-Type Zeolites

ZSM-58 can be prepared from a reaction mixture containing a source of an alkali or alkaline earth metal (M) cation, such as sodium; optionally a source of an oxide of aluminum; a source of an oxide of silicon; and a source of an organic cation (R) of a methyltropinium salt, such as a halide, hydroxide, or sulfate; and water. For example, a reaction mixture for forming ZSM-58 can include sodium hydroxide (NaOH), optionally sodium aluminate ($NaAlO_3$), a silicon oxide (typically $SiO_2$), methyltropinium iodide (potentially referred to as MTI), and water ($H_2O$). Suitable ratios for the various components in the reaction mixture can include those listed in Table A below.

TABLE A

| Reactants | Suitable | Preferred | U.S. Pat. No. 4,698,217 (broad) | U.S. Pat. No. 4,698,217 (narrow) |
|---|---|---|---|---|
| $SiO_2:Al_2O_3$ | 50 or higher* | 50-1000 (or higher)* | 50-1000 | 70-500 |
| $H_2O:SiO_2$ | 10-25 | 12-20 | 5-200 | 10-100 |
| $OH^-:SiO_2$ | 0-2.0 | 0-1.0 | 0-2.0 | 0.1-1.0 |
| $M:SiO_2$ | 0.01-3.0 | 0.01-1.0 | 0.01-3.0 | 0.1-1.0 |
| $R:SiO_2$ | 0.01-2.0 | 0.01-0.5 | 0.01-2.0 | 0.1-0.5 |

*including mixtures with no intentionally added source of alumina.

As noted in Table A, intentional addition of a source of alumina is not required. For synthesis mixtures with little or no intentionally added alumina, the ratio of $SiO_2:Al_2O_3$ can usually be determined by the aluminum impurities present in the reagents. Though aluminum-containing impurities may be present in trace/contaminant amounts in components of the mixture (e.g., in the source of silica), such components are not considered sources of alumina herein.

Preferably, the synthesis mixture for synthesis of ZSM-58 crystals can further include seeds to facilitate crystal formation. One option can be to introduce seed crystals corresponding to the desired crystal structure. Any convenient type of crystals can be used, such as dried crystals, wet crystals, or a wet cake of crystals. The seed crystals need not necessarily be processed using ion exchange or other finishing processes that would normally be applied to crystals for use in a production environment.

Crystallization of the ZSM-58 can be carried out at either static or stirred conditions in a suitable reactor vessel (e.g., in a polypropylene jar or a Teflon™-lined or stainless steel autoclave). The total useful range of temperatures for crystallization can extend from about 80° C. to about 225° C. (e.g., from about 120° C. to about 175° C.). When a synthesis mixture is initially formed, the temperature of the synthesis mixture can be increased to the desired synthesis temperature in any convenient manner. For example, the temperature of the synthesis mixture can be increased by at least 10° C. per hour, for example at least 25° C. per hour, at least 40° C. per hour, or at least 75° C. per hour, until the desired synthesis temperature is achieved. The temperature can be maintained for a time sufficient for crystallization to occur at the temperature used, e.g., which can range from about 24 hours to about 60 days. Thereafter, the crystals can be separated from the liquid and recovered. For example, after forming the ZSM-58 crystals, the product can be filtered, washed with deionized (DI) water, and dried at a suitable temperature for removing water, such as from about 100° C. to about 140° C.

The reaction mixture can be prepared utilizing materials which supply the appropriate oxides. Such materials may include, but are not necessarily limited to, sodium silicate, silica hydrosol, silica gel, silicic acid, precipitated silica-alumina sols, sodium hydroxide, optionally sodium aluminate, optionally alumina, and the methyltropinium salt directing agent. Methyltropinium salts, such as methyltropinium iodide, chloride, and/or hydroxide, may be commercially available for purchase in sufficient purity for use as reagents. Alternatively, the methyltropinium salt may be synthesized by selective methylation of 3-tropanol at the bridgehead nitrogen. This salt can have the following formula:

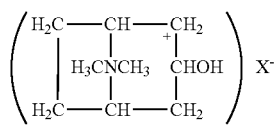

wherein X is an anion, such as, for example, a halide (e.g., iodide, chloride, bromide, or the like, or a combination thereof), nitrate, hydroxide, sulfate, bisulfate, perchlorate, or the like, or a combination thereof.

It should be realized that the reaction mixture components can be supplied by more than one source. The reaction mixture can be prepared either batchwise or continuously. Crystal size and crystallization time of the new crystalline material can vary with the nature of the reaction mixture employed and the crystallization conditions. Optionally, synthesis of the ZSM-58 crystals can be facilitated by the presence of about 0.05 wt % to about 5.0 wt % (e.g., from about 0.10 wt % to about 5.0 wt % or from about 1.0 wt % to about 5.0 wt %) seed crystals of crystalline product.

The ZSM-58 crystals synthesized according to various embodiments of the invention can have a purity of at least about 85 wt %, e.g., at least about 90 wt %, at least about 95 wt %, or at least about 98 wt %. The purity refers to the wt % of crystals that have a ZSM-58 type morphology versus other types of crystalline morphologies present in a crystalline product.

Typically, zeolite crystals can be formed by first creating a synthesis mixture of components, such as the synthesis mixtures described herein. This mixture may or may not be aged at ambient conditions for anywhere from about 0.5 to about 48 hours prior to crystallization. After heating the synthesis mixture at an effective temperature for an effective period of time, the crystals formed in the synthesis mixture can be separated from the aqueous environment of the mixture, such as by filtration. The crystals can then be typically dried and calcined prior to use. In relatively small batches, for example on a bench scale, the crystals can be calcined at a temperature from about 350° C. to about 925° C. for about 1 minute to about 1 hour, e.g., about 1 minute to about 20 minutes. However, calcination time can often depend upon the amount (e.g., weight and/or volume) being processed at any given time. In relatively large batches, the crystals my need to be calcined for up to 16 hours in order to achieve the same calcination level as in a relatively small batch. To reach the calcination temperature, the temperature of the oven or other device for heating the crystals can be ramped at about 50° C. per hour, about 100° C. per hour, or at another convenient increment. The crystals can optionally be held at incremental temperatures (e.g., every hour, every other hour, etc.) for a period of time prior to continuing to increase the temperature to the desired final calcination temperature. The incremental heating can allow water vapor to exit the crystal structure while reducing/minimizing damage to, and/or morphology changes in, the crystals.

Additionally or alternately, after crystal formation, the crystals can be treated using one or more of several procedures. One procedure can include filtering, washing with deionized (DI) water, and drying the crystals at a suitable temperature for removing water, such as from about 100° C. to about 140° C.

In some forms, DDR-type crystals can contain organic material(s) that was(were) used as the template/structure directing agent(s). Prior to use as a catalyst or adsorbent, such material can be treated to remove all or part of the organic constituent. This can be conveniently effected by heating such organic-containing crystals at a temperature from about 250° C. to about 550° C., e.g., for from 1 hour to about 48 hours.

The crystalline materials of this invention, when employed either as an adsorbent or as a catalyst, can also be at least partially dehydrated. This can be done by heating to a temperature in the range from 200° C. to about 370° C. in an oxidative or inert atmosphere (such as air or nitrogen, respectively) and at atmospheric, subatmospheric, or superatmospheric pressures, e.g., for between about 30 minutes and about 48 hours. Dehydration can also be performed at room temperature (~20-25° C.) merely by placing the DDR-type crystals in a vacuum, but a longer time may be required to obtain a sufficient amount of dehydration.

Optionally, the crystals can also be calcined at a temperature of about 350° C. to about 925° C. for 1 to 20 minutes. To reach the calcination temperature, the temperature of the oven or other device for heating the crystals can be raised in increments of 50° C., 100° C., or another convenient increment. The crystals can be held at the incremental temperatures for a period of time prior to continuing to increase the temperature to the desired final calcination temperature. The incremental heating can allow water vapor to exit the crystal structure while reducing or minimizing damage and/or morphology changes in the crystals.

To the extent desired, the original cations of the as-synthesized material, such as sodium cations, can be replaced in accordance with techniques well known in the art, at least in part, by ion exchange with other cations. Preferred replacing cations include metal ions, hydrogen ions, hydrogen precursor, e.g., ammonium ions and mixtures thereof.

In various embodiments, the above procedures can be modified and/or replaced in order to perform an ion exchange procedure in order to reduce the content of sodium or other alkali metal impurities. After heating a synthesis mixture for a sufficient amount of time to form crystals, the crystals in a synthesis mixture can be separated from the aqueous environment of the mixture, such as by filtration. The separated crystals can then be exposed to a water wash. For example, the filtered crystals can be rinsed with water at a temperature between about 20° C. and about 90° C. (such as between about 20° C. and about 70° C.). The volume of water used for the water wash can typically be at least the volume of the corresponding crystals. Optionally, the crystals can also be exposed to an organic wash, such as using acetone, before or after the water wash. The organic wash can be performed at a convenient temperature, such as below about 40° C., with a volume of organic solvent that, like the water, can be at least the volume of the crystals. After the water wash and the optional organic wash, the washed crystals can be filtered to separate them from the wash fluids. After filtration and drying, an initial calcination can be performed on the crystals, such as a calcination as described above. The heating profile for the calcinations can optionally include pauses at incremental temperature values to allow for more thorough drying of the filtered crystals. The crystals can then be exposed to an acidic aqueous environment, such as a 1M solution of acetic acid, ammonium nitrate, or hydrochloric acid. Other suitable acidic solutions can include acidic solutions compatible with the zeolite crystals (i.e., that do not dissolve and/or decrystallize the zeolite), such as other strong acids and organic acids with a pKa value of 6.0 or less, e.g., 5.0 or less. This can allow the alkali metal impurities in the DDR-type zeolites to be exchanged with hydrogen ions from the acidic solution. After the exchange, the crystals can be dried/calcined for a second time prior to use. The acidic solution can have any convenient concentration, so long as an excess of ions are available in solution for exchange with the alkali metal impurities in the crystals. For convenience, the acidic solution can have a concentration of at least about 0.1 M, e.g., at least about 1.0 M.

Control of Crystal Size Distribution

In addition to facilitating a novel crystal morphology, the use of seed crystals can also facilitate synthesis of ZSM-58 crystals with improved uniformity of crystal size. The size distribution for crystals in a sample can be determined by light scattering, such as by using a Horiba™ light scattering detector for determining a size distribution of crystals as a function of volume. In the size distributions described herein, the size distribution can be expressed as a series of bins of ~1 µm size.

An improved size distribution for the synthesis methods described herein can be defined based on several factors. First, a plot of the size distribution relative to volume can preferably be mono-modal, so as to exhibit a single peak (e.g., not be bi-modal or otherwise multi-modal). For the discussion herein, the size distribution is considered bi-modal if two separate peaks in a size distribution plot have a peak volume percentage greater than 2.5% and thus considered mono-modal if only one peak is present whose volume percentage is greater than 2.5%. Another preferable feature can be that the peak height for the primary (or only) peak in the volume distribution can correspond to at least 10% of the crystal volume. In other words, the 1 µm bin corresponding to the peak in the volume distribution can include crystals corresponding to at least 10% of the crystal volume. A third preferable feature can be that less than 10% of the total crystal volume can correspond to crystals with a characteristic size of less than 5 µm.

Still another potential feature can involve the width of the primary peak. In the Horiba™ plots in FIGS. 1D, 2B, 3B, and 4B, the bottom (x-) axis corresponds to the log of the crystal size, which plot aspect resulted in the appearance of a roughly Gaussian shape for the primary peak. One way of characterizing a Gaussian type shape can be based on the full width of the peak at half of the maximum height (full-width half-maximum). Although such a full width at half maximum measurement would correspond to a log scale width in this case, a width expressed on a linear scale can be derived based on the height values on either side of the peak. In some embodiments, the difference between the crystal sizes at full-width half-maximum can be about the maximum height of the peak or less. For example, a hypothetical Horiba™ plot of crystal size could have a peak at a crystal size of 17 µm. At half of the peak height, the crystal size values can be 12 µm and 26 µm, respectively, which would result in a difference in the crystal sizes at half-maximum of 14 µm, which is less than the crystal size at the peak. It is noted that this definition for a "narrow" crystal size distribution scales up as the size value for the most common crystal size increases.

Other Embodiments

Additionally or alternately, the present invention can include one or more of the following embodiments.

Embodiment 1

A composition comprising ZSM-58 crystals having a rounded disc morphology with an axis ratio of 1.1 or less, the axis ratio being a ratio of a vertex-to-vertex distance and an edge-to-edge distance, a depth dimension being less than the vertex-to-vertex distance and the edge-to-edge distance, the ZSM-58 crystals having a unimodal volume versus crystal size distribution where less than 10 volume percent of the ZSM-58 crystals have a characteristic size of about 5 µm or less, the ZSM-58 crystals have a purity of at least about 90%.

Embodiment 2

The composition of embodiment 1, wherein a crystal size for a peak in the unimodal volume versus crystal size distribution is about 15 µm to about 40 µm, and a peak height in the volume versus crystal size plot with a 1 µm bin width is at least about 10 volume percent.

Embodiment 3

The composition of embodiment 1 or embodiment 2, wherein the unimodal volume versus crystal size distribution further comprises a volume versus crystal size distribution where the difference between crystal sizes at volumes corresponding to half of the peak height is about the crystal size for the peak or less.

Embodiment 4

The composition of any one of embodiments 1-3, wherein a ratio of the depth dimension to the edge-to-edge distance is about 0.9 or less.

Embodiment 5

A method for synthesizing a DDR framework type zeolite, comprising: forming a reaction mixture capable of forming crystalline DDR framework type material such as ZSM-58, the mixture comprising water, a silicon oxide (preferably $SiO_2$), an alkali or alkaline earth hydroxide, and a methyltropinium salt structure directing agent, the mixture having a molar ratio of water to silicon oxide of about 12 to about 25, preferably about 12 to about 20, a molar ratio of hydroxide to silicon oxide of about 0.01 to about 1.0, a molar ratio of alkali and alkaline earth metal to silicon oxide of about 0.01 to about 1.0, a molar ratio of structure directing agent to silicon oxide of about 0.01 to about 2.0, and at least about 0.05 wt % of seeds relative to the weight of silicon oxide in the mixture, preferably about 1.0 wt % or less of seeds; and recovering DDR framework type crystals (such as ZSM-58 crystals) having an axis ratio of 1.1 or less, the axis ratio being a ratio of a vertex-to-vertex distance and an edge-to-edge distance, a depth dimension being less than the vertex-to-vertex distance and the edge-to-edge distance, the structure directing agent preferably comprising or being methyltropinium chloride.

Embodiment 6

The method of embodiment 5, wherein the DDR framework type crystals have a unimodal volume versus crystal size distribution where less than 10 volume percent of the DDR framework type crystals have a characteristic size of about 5 μm or less, a crystal size for a peak in the volume versus crystal size distribution is about 15 μm to about 40 μm, and a peak height in the volume versus crystal size plot with a 1 μm bin width is at least about 10 volume percent.

Embodiment 7

The method of embodiment 5 or embodiment 6, wherein the unimodal volume versus crystal size distribution further comprises a volume versus crystal size distribution where the difference between crystal sizes at volumes corresponding to half of the peak height is about the crystal size for the peak or less.

Embodiment 8

The method of any one of embodiments 5-7, wherein the reaction mixture further comprises about 0.05 wt % to about 5.0 wt % seed crystals based on the weight of silica in the reaction mixture.

Embodiment 9

The method of any one of embodiments 5-8, wherein the reaction mixture further comprises an alumina source.

Embodiment 10

The method of any one of embodiments 5-9, wherein the axis ratio is 1.05 or less.

Embodiment 11

The method of any one of embodiments 5-10, wherein a ratio of the depth dimension to the edge-to-edge distance is about 0.9 or less.

Embodiment 12

The method of any of embodiments 5-11, wherein the reaction mixture is maintained at a temperature of about 120° C. to about 175° C. during formation of the DDR framework type crystals.

EXAMPLES

Example of Overall Crystal Composition

In various embodiments, controlling the synthesis conditions as described above can allow for forming a novel ZSM-58 composition. In some embodiments, the ZSM-58 composition can preferably have one or more size distribution features as described above, such as a mono-modal distribution and/or a distribution where less than 10% of the total crystal volume corresponds to crystals with a characteristic size of less than 5 μm. Additionally or alternately, the ZSM-58 composition can preferably have a rounded disc morphology, with an axis ratio of about 1.1 or less (e.g., about 1.05 or less) and a ratio of depth to edge-to-edge length of about 0.9 or less (e.g., about 0.85 or less). The resulting molar $SiO_2:Al_2O_3$ ratio in the synthesized crystals can be a function of the total aluminum present in the reaction mixture. In the absence of an intentionally added source of alumina, the $SiO_2:Al_2O_3$ ratio can typically reflect the $SiO_2:Al_2O_3$ ratio of the silica raw material. Optionally but preferably, the ZSM-58 composition can be formed from a synthesis mixture containing at least about 0.05 wt % of seeds. Additionally or alternately, the synthesis mixture can contain less than about 1.0 wt %, e.g., less than about 0.5 wt %, of seeds.

Comparative Example A (from U.S. Pat. No. 4,698,217)

Several working examples in U.S. Pat. No. 4,698,217 are provided to describe the synthesis of ZSM-58. Table B shows the reaction conditions based on the Examples in this prior art publication. These synthesis conditions were tested for comparison with the improved crystal synthesis conditions provided herein. Table B describes synthesis mixtures that include methyltropinium iodide as the structure directing agent (SDA). Sources of (oxides of) aluminum were included in the reaction mixtures, but seed crystals were not. The $H_2O:SiO_2$ ratios of the Examples were 40. The temperatures of crystal formation for the Examples were 160° C., while the stir rates were 400 rpm. After 4 days, crystals with a relatively uniform average size of about 1 μm were produced.

TABLE B

| Comparative Synthesis Mixture | |
|---|---|
| Reactants | Comparative Ex. A |
| $SiO_2:Al_2O_3$ ratio (molar) | 60-300 |
| $H_2O:SiO_2$ ratio (molar) | 40 |
| $OH^-:SiO_2$ ratio (molar) | 0.3-0.4 |
| $Na:SiO_2$ ratio (molar) | 0.3-0.4 |
| $SDA:SiO_2$ ratio (molar) | 0.25 |
| wt % seeds (grams of seeds per grams of silica in slurry) | 0 |
| Average crystal size, μm (SEM) | ~1 |

Examples 1-7

In Examples 1-7, the following synthesis protocol was used. Reagents were added to a beaker in the following order: deionized water; sodium hydroxide (~50 wt % solution); silica (Ludox™ HS-40); seed crystals; and structure directing agent (SDA). In some cases, the gel was allowed to age overnight (about 16 hours) at ambient conditions prior to charging the mixture to the crystallizer. The aging appeared to have no impact on the final product. Each mixture was then charged to an autoclave for heating and mixing. Each mixture was then stirred using a mixing paddle at either ~30 rpm or ~200 rpm within the autoclave. Each stir speed corresponded to a tip speed within the vessel of less than ~0.5 m/s. The gels were each stirred at the reaction temperature for about 4-6 days to produce crystals.

Example 1

Synthesis of ZSM-58 (Hexagonal Morphology)

In Example 1, ZSM-58 crystals were formed using methyltropinium iodide (MTPI) as the structure directing agent. The ratios of components in the synthesis mixture are shown below in Table 1. The synthesis temperature was about 160° C. The mixture was stirred at a stir speed of ~30 rpm within the mixture vessel. The synthesis mixture did not include a separate (intentional) source of alumina

TABLE 1

Example 1 Synthesis Mixture

| Reactants | Example 1 |
|---|---|
| $H_2O:SiO_2$ ratio (molar) | ~47 |
| $OH^-:SiO_2$ ratio (molar) | ~0.11 |
| $Na:SiO_2$ ratio (molar) | ~0.11 |
| $SDA:SiO_2$ ratio (molar) | ~0.25 |
| wt % seeds (grams of seeds per grams of silica in slurry) | ~0.1% |
| Peak crystal size, μm (Horiba light scattering) | ~20 |
| General morphology (SEM) | Hexagonal |
| Axis ratio | ~1.2 |

Figure 1C:
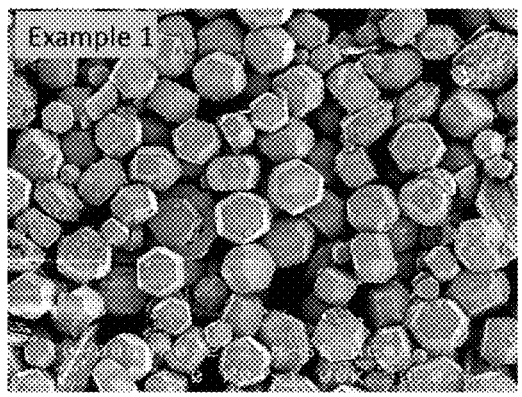
Figure 1D:
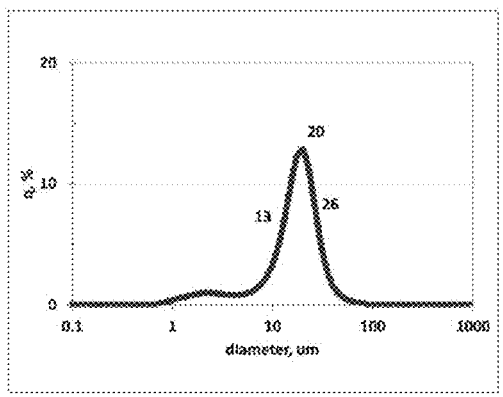
FIG. 1D shows a size distribution for ZSM-58 crystals.

As shown in Table 1, the synthesis mixture included an $H_2O:SiO_2$ ratio of ~47. Due to the relatively high $H_2O:SiO_2$ molar ratio, the resulting crystal morphology appeared to constitute hexagonal discs. The hexagonal disc morphology can be seen in FIGS. 1b and 1c, which show SEM micrographs at different levels of magnification. The axis ratio of the vertex-to-vertex distance relative to the edge-to-edge distance was determined to be ~1.2. The peak (average) crystal size was determined to be about 20 μm. FIG. 1d shows the distribution of crystal sizes based on the volume percent of crystals within a particular size range. The size distribution in FIG. 1d was obtained using a Horiba™ light scattering particle size detector. As shown in FIG. 1d, the crystal size distribution was relatively narrow, with the most common (peak) crystal size of ~20 μm corresponding to more than ~10% of the crystal volume. The relatively narrow distribution was attributed to the use of seed crystals in the synthesis mixture.

Example 2

Synthesis of ZSM-58 (Hexagonal Morphology)

In Example 2, ZSM-58 crystals were formed using methyltropinium iodide (MTPI) as the structure directing agent. The ratios of components in the synthesis mixture are shown below in Table 2. The synthesis temperature was ~140° C. The mixture was stirred at a stir speed of ~30 rpm within the mixture vessel. The synthesis mixture did not include a separate source of alumina.

TABLE 2

Example 2 Synthesis Mixture

| Reactants | Example 2 |
|---|---|
| $H_2O:SiO_2$ ratio (molar) | ~47 |
| $OH^-:SiO_2$ ratio (molar) | ~0.11 |
| $Na:SiO_2$ ratio (molar) | ~0.11 |
| $SDA:SiO_2$ ratio (molar) | ~0.25 |
| wt % seeds (grams of seeds per grams of silica in slurry) | ~0.1% |
| Peak crystal size, μm (Horiba light scattering) | ~26 |
| General morphology (SEM) | Hexagonal |
| Axis ratio | ~1.2 |

Figure 2A:
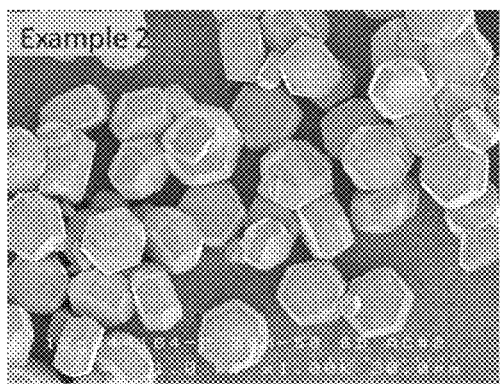
FIGS. 2A and 2B show an SEM micrograph and a size distribution for ZSM-58 crystals with a hexagonal morphology.
Figure 2B:
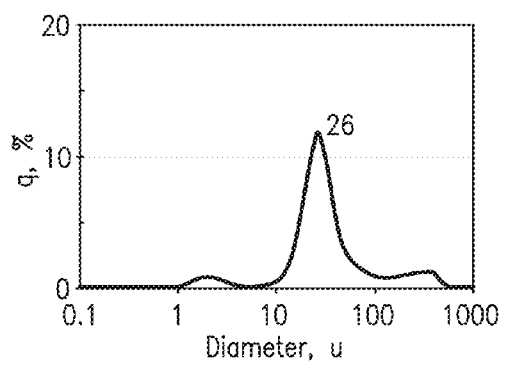

As shown in Table 2, the synthesis mixture included an $H_2O:SiO_2$ ratio of ~47. Due to the relatively high $H_2O:SiO_2$ molar ratio, the resulting crystal morphology appeared to constitute hexagonal discs. The hexagonal disc morphology can be seen in FIG. 2a, which shows an SEM micrograph of the crystals generated from Example 2. The axis ratio of the vertex-to-vertex distance relative to the edge-to-edge distance was determined to be ~1.2. The peak (average) crystal size was determined to be about 26 μm. FIG. 2b shows the distribution of crystal sizes based on the volume percent of crystals within a particular size range. As shown in FIG. 2b, the crystal size distribution was relatively narrow, with the most common (peak) crystal size of ~26 μm corresponding to more than ~10% of the crystal volume. The relatively narrow distribution was attributed to the use of seed crystals in the synthesis mixture.

Examples 1-2 compare the crystals from MTPI formulations at relatively high $H_2O:SiO_2$ molar ratios and different temperatures (~140° C., ~160° C.). As shown in the SEM images, both formulations yielded hexagonal-shaped discs.

Example 3

Synthesis of ZSM-58 (Rounded Morphology)

In Example 3, ZSM-58 crystals were formed using methyltropinium iodide (MTPI) as the structure directing agent. The ratios of components in the synthesis mixture are shown below in Table 3. The synthesis temperature was ~140° C. The mixture was stirred at a stir speed of ~30 rpm within the mixture vessel. The synthesis mixture did not include a separate source of alumina.

TABLE 3

Example 3 Synthesis Mixture

| Reactants | Example 3 |
|---|---|
| $H_2O:SiO_2$ ratio (molar) | ~19 |
| $OH^-:SiO_2$ ratio (molar) | ~0.11 |
| $Na:SiO_2$ ratio (molar) | ~0.11 |
| $SDA:SiO_2$ ratio (molar) | ~0.21 |
| wt % seeds (grams of seeds per grams of silica in slurry) | ~0.3% |
| Peak crystal size, μm (Horiba light scattering) | ~20 |
| General morphology (SEM) | Rounded |
| Axis ratio | ~1.0 |

Figure 3B:
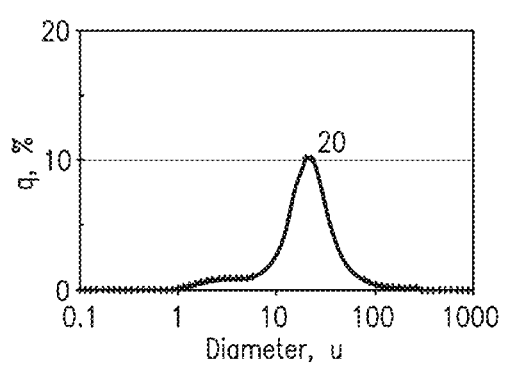

As shown in Table 3, the synthesis mixture included an $H_2O:SiO_2$ ratio of ~19. Due to the relatively low $H_2O:SiO_2$ molar ratio, the resulting crystal morphology appeared to constitute rounded or circular discs. The result demonstrated that the morphology is not necessarily dependent upon the nature of the structure directing agent, or even of any of the components incorporated into the framework. The rounded disc morphology can be seen in FIG. 3a, which shows an SEM micrograph of the crystals generated from Example 3. The axis ratio of the vertex-to-vertex distance relative to the edge-to-edge distance was determined to be ~1.0. The peak (average) crystal size was determined to be about 20 μm. FIG. 3b shows the distribution of crystal sizes based on the volume percent of crystals within a particular size range. As shown in FIG. 3b, the crystal size distribution was relatively narrow, with the most common (peak) crystal size of ~20 μm corresponding to ~10% of the crystal volume. The relatively narrow distribution was attributed to the use of seed crystals in the synthesis mixture.

Example 4

Synthesis of ZSM-58 (Rounded Morphology)

In Example 4, ZSM-58 crystals were formed using methyltropinium iodide (MTPI) as the structure directing agent. The ratios of components in the synthesis mixture are shown below in Table 4. The synthesis temperature was 140° C. The mixture was stirred at a stir speed of 30 rpm within the mixture vessel. The synthesis mixture did not include a separate source of alumina.

TABLE 4

Example 4 Synthesis Mixture

| Reactants | Example 4 |
|---|---|
| $H_2O:SiO_2$ ratio (molar) | ~12 |
| $OH^-:SiO_2$ ratio (molar) | ~0.11 |
| $Na:SiO_2$ ratio (molar) | ~0.11 |
| $SDA:SiO_2$ ratio (molar) | ~0.21 |
| wt % seeds (grams of seeds/wt % slurry) | ~0.4% |
| Peak crystal size, μm (Horiba light scattering) | ~17 |
| General morphology (SEM) | Rounded |
| Axis ratio | ~1.0 |

Figure 4A:
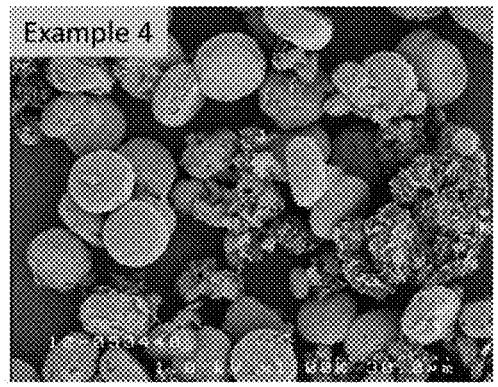
FIGS. 4A and 4B show an SEM micrograph and a size distribution for ZSM-58 crystals with a rounded disc morphology.
Figure 4B:
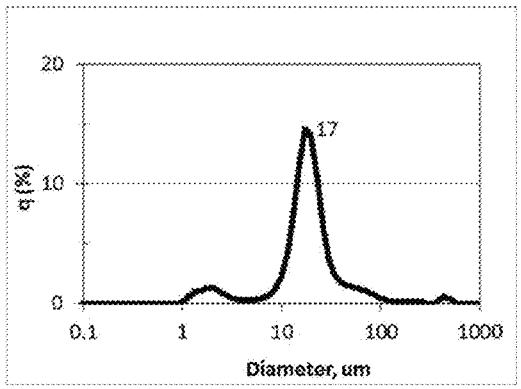

As shown in Table 4, the synthesis mixture included an $H_2O:SiO_2$ ratio of ~12. Due to the relatively low $H_2O:SiO_2$ molar ratio, the resulting crystal morphology appeared to constitute rounded or circular discs. The rounded disc morphology can be seen in FIG. 4a, which shows an SEM micrograph of the crystals generated from Example 4. The axis ratio of the vertex-to-vertex distance relative to the edge-to-edge distance was determined to be ~1.0. The peak (average) crystal size was determined to be about 17 μm. FIG. 4b shows the distribution of crystal sizes based on the volume percent of crystals within a particular size range. As shown in FIG. 4b, the crystal size distribution was relatively narrow, with the most common (peak) crystal size of ~17 μm corresponding to ~15% of the crystal volume. It is noted that FIG. 4a also shows the presence of a layered phase. Without being bound by theory, it is believed that the layered phase appeared due to the mixture being at or close to a lower limit of operative $H_2O:SiO_2$ ratios in the gel composition in the synthesis described in this Example. Regardless, as long as the ZSM-58 crystals appear to have the desired morphology and/or narrow size distribution, the layered phase is believed not to significantly impact adsorption activity, other than by acting as a diluent that could reduce the quantity of the desired crystals in a given volume.

Examples 2-4 provide a comparison of synthesis of ZSM-58 using MTPI at successively lower $H_2O:SiO_2$ ratios. These Examples demonstrated the transition from hexagonal disc morphology at higher $H_2O:SiO_2$ ratios to rounded disc morphology at lower $H_2O:SiO_2$ ratios (e.g., about 25 or less).

Example 5

Synthesis of ZSM-58 (Hexagonal Morphology)

In Example 5, ZSM-58 crystals were formed using methyltropinium Chloride (MTPCl) as the structure directing agent. The ratios of components in the synthesis mixture are shown below in Table 5. The synthesis temperature was ~160° C. The mixture was stirred at a stir speed of ~30 rpm within the mixture vessel. The synthesis mixture did not include a separate source of alumina.

TABLE 5

Example 5 Synthesis Mixture

| Reactants | Example 4 |
|---|---|
| $H_2O:SiO_2$ ratio (molar) | ~47 |
| $OH^-:SiO_2$ ratio (molar) | ~0.11 |
| $Na:SiO_2$ ratio (molar) | ~0.11 |
| $SDA:SiO_2$ ratio (molar) | ~0.25 |
| wt % seeds (grams of seeds per grams of silica in slurry) | ~0.1% |
| Avg. crystal size, μm (Horiba light scattering) | — (~10-15 by SEM) |
| General morphology (SEM) | Hexagonal |
| Axis ratio | ~1.2 |

Figure 5:
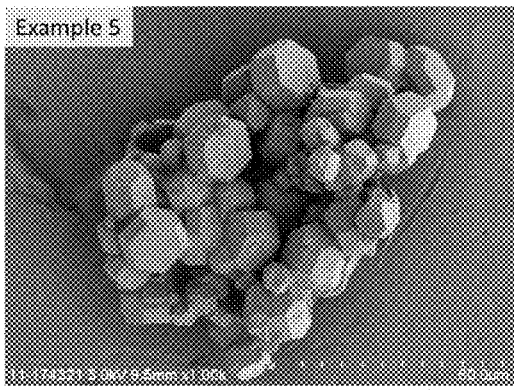
FIG. 5 and shows an SEM micrograph of ZSM-58 crystals with a hexagonal morphology.

As shown in Table 5, the synthesis mixture included an $H_2O:SiO_2$ ratio of ~47. The resulting crystal morphology appeared to constitute hexagonal discs. The hexagonal disc morphology can be seen in FIG. 5, which shows an SEM micrograph of the crystals generated from the synthesis mixture of Example 5. The axis ratio of the vertex-to-vertex distance relative to the edge-to-edge distance was determined to be ~1.2. The average crystal size was determined via SEM and visual inspection to be ~10-15 μm.

Examples 1 and 5 compare replacement of MTPI with MTPCl as the structure directing agent at a relatively high $H_2O:SiO_2$ molar ratio (e.g., at least 45) with otherwise similar conditions. Both Examples 1 and 5 appear to have resulted in production of crystals with hexagonal disc morphology.

Example 6

Synthesis of ZSM-58 (Rounded Morphology)

In Example 6, ZSM-58 crystals were formed using methyltropinium Chloride (MTPCl) as the structure directing agent. The ratios of components in the synthesis mixture are shown below in Table 6. The synthesis temperature was ~160° C. The mixture was stirred at a stir speed of ~200 rpm within the mixture vessel. The synthesis mixture did not include a separate source of alumina

TABLE 6

Example 6 Synthesis Mixture

| Reactants | Example 6 |
|---|---|
| $H_2O:SiO_2$ ratio (molar) | ~19 |
| $OH^-:SiO_2$ ratio (molar) | ~0.11 |
| $Na:SiO_2$ ratio (molar) | ~0.11 |
| $SDA:SiO_2$ ratio (molar) | ~0.13 |
| wt % seeds (grams of seeds per grams of silica in slurry) | ~0.2% |
| Avg. crystal size, μm (Horiba light scattering) | — (~20-25 by SEM) |
| General morphology (SEM) | Rounded |
| Axis ratio | ~1.0 |

Figure 6:
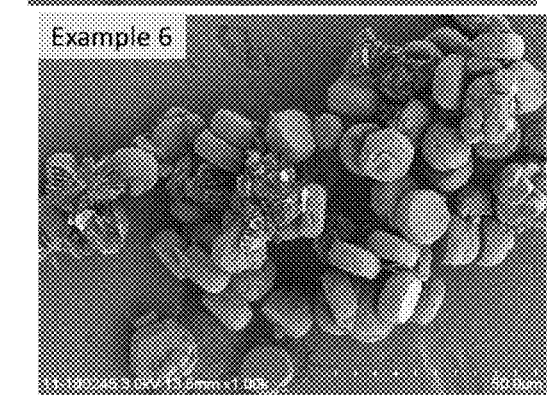
FIG. 6 and shows an SEM micrograph of ZSM-58 crystals with a rounded disc morphology.

As shown in Table 6, the synthesis mixture included an $H_2O:SiO_2$ ratio of ~19. Due to the relatively low $H_2O:SiO_2$ molar ratio, the resulting crystal morphology appeared to constitute rounded discs. The rounded disc morphology can be seen in FIG. 6, which shows an SEM micrograph of the crystals generated from the synthesis mixture of Example 6. The axis ratio of the vertex-to-vertex distance relative to the edge-to-edge distance was determined to be ~1.0. The average crystal size was determined via SEM and visual inspection to be ~20-25 μm.

Examples 5-6 compare products from formulations using MTPCl at different $H_2O:SiO_2$ ratios. Example 6 shows that both MTPI and MTPCl are effective for producing ZSM-58 crystals with rounded disc morphology.

Example 7

Synthesis of ZSM-58 (Rounded Morphology)

In Example 7, ZSM-58 crystals were formed using methyltropinium Chloride (MTPCl) as the structure directing agent. The ratios of components in the synthesis mixture are shown below in Table 7. The synthesis temperature was ~140° C. The mixture was stirred at a stir speed of 200 rpm within the mixture vessel. The synthesis mixture did not include a separate source of alumina.

TABLE 7

Example 7 Synthesis Mixture

| Reactants | Example 7 |
|---|---|
| $H_2O:SiO_2$ ratio (molar) | ~19 |
| $OH^-:SiO_2$ ratio (molar) | ~0.11 |
| $Na:SiO_2$ ratio (molar) | ~0.11 |
| $SDA:SiO_2$ ratio (molar) | ~0.13 |
| wt % seeds (grams of seeds/wt % slurry) | ~0.2% |
| Avg. crystal size, µm (Horiba light scattering) | — (~15-20 by SEM) |
| General morphology (SEM) | Rounded |
| Axis ratio | ~1.1 |

Figures 7A, 7B:
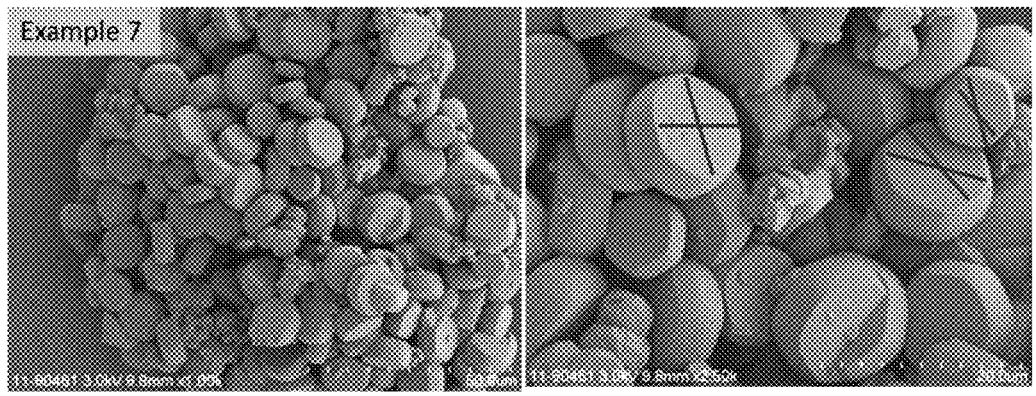
FIGS. 7a and 7b show SEM micrographs of ZSM-58 crystals with a rounded disc morphology.

As shown in Table 7, the synthesis mixture included an $H_2O:SiO_2$ ratio of ~19. The resulting crystal morphology appeared to constitute rounded discs. The rounded disc morphology can be seen in FIGS. 7a-7b, which show SEM micrographs of the crystals generated from the synthesis mixture of Example 7. FIG. 7b is at a higher magnification, and shows examples of the vertex-to-vertex and edge-to-edge lines used to determine the axis ratio. The axis ratio of the vertex-to-vertex distance relative to the edge-to-edge distance was determined to be ~1.1. The average crystal size was determined via SEM and visual inspection to be ~15-20 µm.

Examples 6-7 compare the products from MTPCl formulations at relatively low $H_2O:SiO_2$ ratios but at different temperatures. Other than a marginally larger value for the axis ratio, the synthetic mixtures in Examples 6-7 produced roughly similar crystals.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for synthesizing a DDR framework type zeolite, comprising:
   forming a reaction mixture capable of forming crystalline DDR framework type material, the mixture comprising water, a silicon oxide, an alkali or alkaline earth hydroxide, and a methyltropinium salt structure directing agent, the mixture having a molar ratio of water to silicon oxide of about 12 to about 25, a molar ratio of hydroxide to silicon oxide of about 0.01 to about 1.0, a molar ratio of alkali and alkaline earth metal to silicon oxide of about 0.01 to about 1.0, a molar ratio of structure directing agent to silicon oxide of about 0.01 to about 1.0, and at least about 0.05 wt % of seeds relative to the weight of silicon oxide in the mixture; and
   recovering DDR framework type crystals having an axis ratio of 1.1 or less, the axis ratio being a ratio of a vertex-to-vertex distance and an edge-to-edge distance, a depth dimension being less than the vertex-to-vertex distance and the edge-to-edge distance.

2. The method of claim 1, wherein the reaction mixture further comprises from about 0.05 wt % to about 5.0 wt % seed crystals based on the weight of silicon oxide in the reaction mixture.

3. The method of claim 1, wherein the structure directing agent is methyltropinium chloride and the DDR framework type crystals substantially comprise ZSM-58.

4. The method of claim 1, wherein the reaction mixture has a molar ratio of water to silicon oxide of about 12 to about 20.

5. The method of claim 1, wherein the reaction mixture further comprises an alumina source.

6. The method of claim 1, wherein the axis ratio is 1.05 or less.

7. The method of claim 1, wherein a ratio of the depth dimension to the edge-to-edge distance is about 0.9 or less.

8. The method of claim 1, wherein less than 10 volume percent of the ZSM-58 crystals have a characteristic size of about 5 µm or less.

9. The method of claim 1, wherein the reaction mixture is maintained at a temperature of about 120° C. to about 175° C. during formation of the DDR framework type crystals.

10. A method for synthesizing a DDR framework type zeolite, comprising:
    forming a reaction mixture capable of forming crystalline DDR framework type material, the mixture comprising water, a silicon oxide, an alkali or alkaline earth hydroxide, and a methyltropinium salt structure directing agent, the mixture having a molar ratio of water to silicon oxide of about 12 to about 25, a molar ratio of hydroxide to silicon oxide of about 0.01 to about 1.0, a molar ratio of alkali and alkaline earth metal to silicon oxide of about 0.01 to about 1.0, a molar ratio of structure directing agent to silicon oxide of about 0.01 to about 2.0, and at least about 0.05 wt % of seeds relative to the weight of silicon oxide in the mixture; and
    recovering DDR framework type crystals having a unimodal volume versus crystal size distribution where less than 10 volume percent of the DDR framework type crystals have a characteristic size of about 5 µm or less, a crystal size for a peak in the volume versus crystal size distribution is about 15 µm to about 40 µm, and a peak height in the volume versus crystal size plot with a 1 µm bin width is at least about 10 volume percent.

11. The method of claim 10, wherein the unimodal volume versus crystal size distribution further comprises a volume versus crystal size distribution where the difference between crystal sizes at volumes corresponding to half of the peak height is about the crystal size for the peak or less.

12. The method of claim 10, wherein the mixture comprises about 1.0 wt % of less of seeds relative to the weight of silica in the mixture.

13. The method of claim 10, wherein the recovered DDR framework type crystals have an axis ratio of 1.1 or less, the axis ratio being a ratio of a vertex-to-vertex distance and an edge-to-edge distance, a depth dimension being less than the vertex-to-vertex distance and the edge-to-edge distance.

14. The method of claim 13, wherein a ratio of the depth dimension to the edge-to-edge distance is about 0.9 or less.

15. The method of claim 10, wherein the structure directing agent is methyltropinium chloride and the DDR framework type crystals substantially comprise ZSM-58.

16. The method of claim 10, wherein the reaction mixture has a molar ratio of water to silicon oxide of about 12 to about 25.

17. A composition comprising ZSM-58 crystals having a rounded disc morphology with an axis ratio of 1.1 or less, the axis ratio being a ratio of a vertex-to-vertex distance and an edge-to-edge distance, a depth dimension being less than the vertex-to-vertex distance and the edge-to-edge distance, the ZSM-58 crystals having a unimodal volume versus crystal size distribution where less than 10 volume percent of the ZSM-58 crystals have a characteristic size of about 5 μm or less, the ZSM-58 crystals having a purity of at least about 90%.

18. The composition of claim 17, wherein a crystal size for a peak in the volume versus crystal size distribution is about 15 μm to about 40 μm, and a peak height in the volume versus crystal size plot with a 1 μm bin width is at least about 10 volume percent.

19. The composition of claim 18, wherein the unimodal volume versus crystal size distribution further comprises a volume versus crystal size distribution where the difference between crystal sizes at volumes corresponding to half of the peak height is about the crystal size for the peak or less.

20. The composition of claim 17, wherein a ratio of the depth dimension to the edge-to-edge distance is about 0.9 or less.

\* \* \* \* \*